United States Patent [19]
Bolger et al.

[11] Patent Number: 4,742,283
[45] Date of Patent: May 3, 1988

[54] GUIDANCE SYSTEM FOR INDUCTIVELY COUPLED ELECTRIC VEHICLES

[75] Inventors: John G. Bolger, Orinda; Lung S. Brian Ng, Berkeley, both of Calif.

[73] Assignee: Inductran Corporation, Berkeley, Calif.

[21] Appl. No.: 936,141

[22] Filed: Nov. 28, 1986

[51] Int. Cl.⁴ .............................................. G05D 1/00
[52] U.S. Cl. ..................................... 318/587; 180/167
[58] Field of Search ................ 318/587; 180/167, 168, 180/169

[56] References Cited
U.S. PATENT DOCUMENTS

| | | | |
|---|---|---|---|
| 3,431,996 | 3/1969 | Giles et al. | 318/587 |
| 4,227,595 | 10/1980 | Hamada | 180/167 X |
| 4,472,716 | 9/1984 | Hansen | 180/168 |
| 4,593,239 | 6/1986 | Yamamoto | 318/587 |
| 4,658,928 | 4/1987 | Seo | 318/587 |

*Primary Examiner*—Benjamin Dobeck
*Attorney, Agent, or Firm*—Owen, Wickersham & Erickson

[57] ABSTRACT

An automatic guidance device for an electrically driven vehicle inductively coupled by a power receiver core to a roadway core connected to power source. The device which is attached to the power receiver core or to a ferrous bar connected to the underside of the vehicle comprises at least two sensor coils equally spaced from the midpoint of the power receiver core which is on the vehicle centerline. End portions of the vehicle core or bar which extend beyond the coils comprises magnetic poles which receive flux from the roadway inductor. Flux through the coils produces voltages which vary in proportion to their distance from the roadway inductor centerline and are compared to produce error signals used to control a steering servo on the vehicle. In event of roadway power failure a circuit is provided to enable the utilization of battery power to produce sufficient flux to maintain the production of error signals and thus steering control.

9 Claims, 3 Drawing Sheets

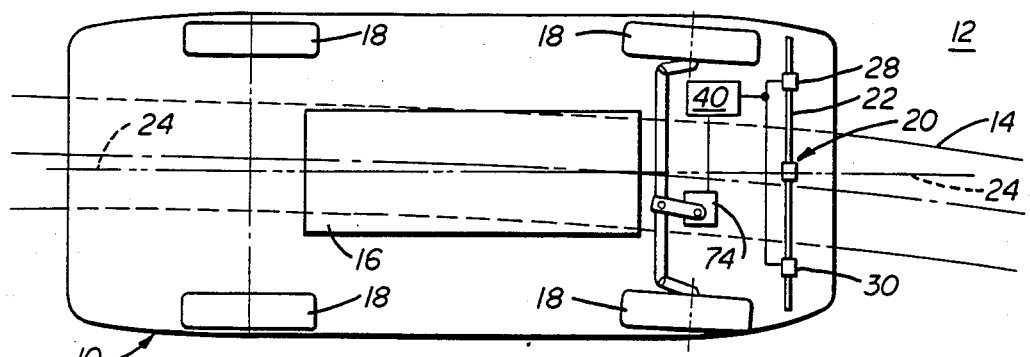
FIG._1.
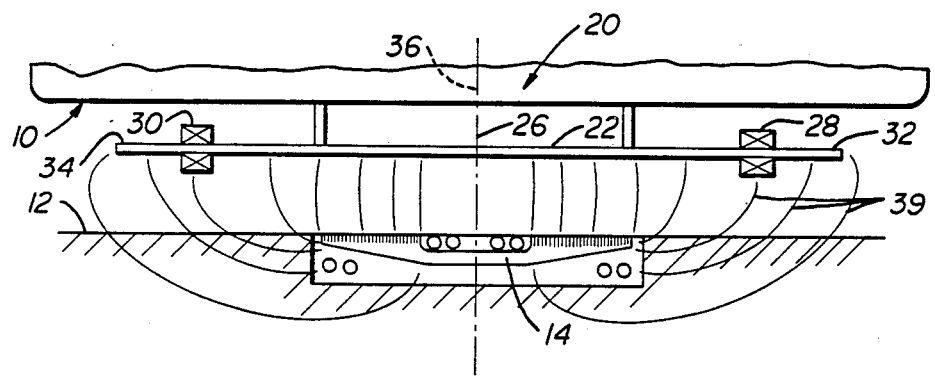
FIG._2.
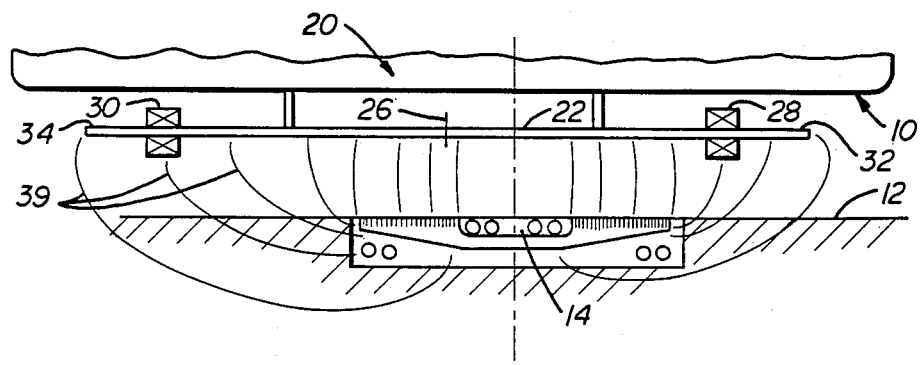
FIG._3.

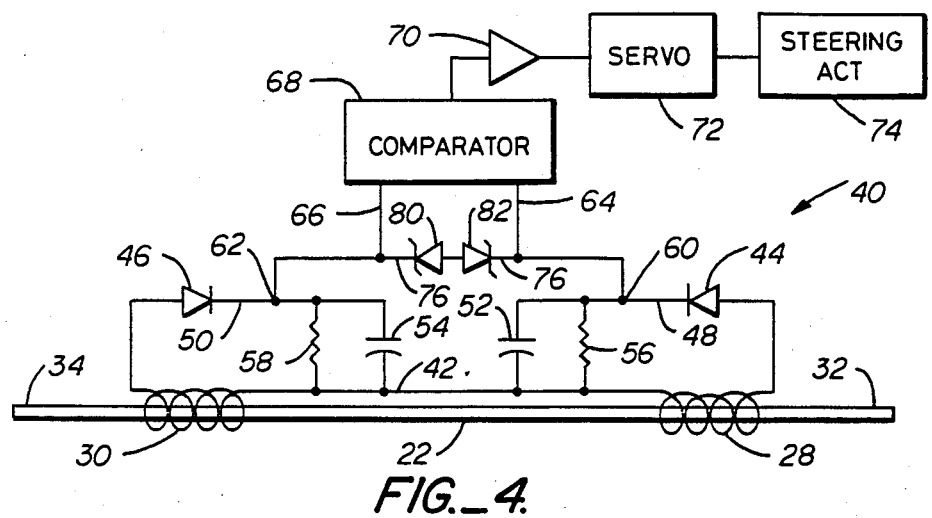
FIG._4.
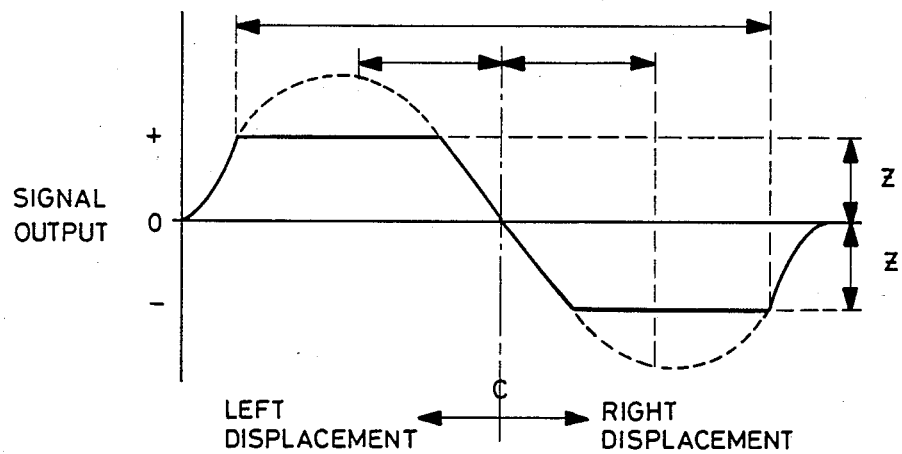
FIG._5.
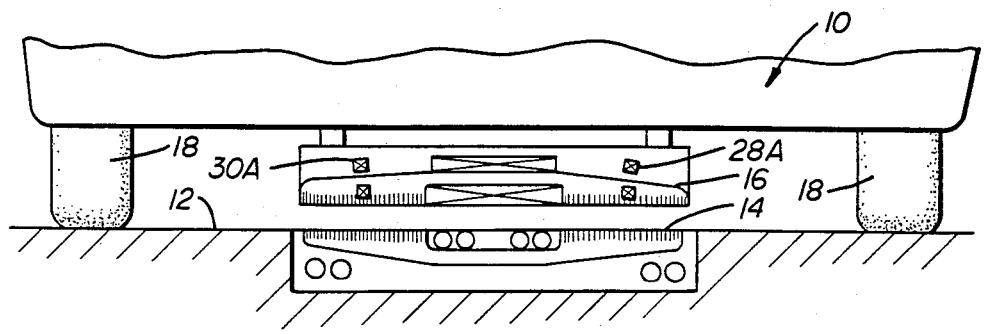
FIG._6.

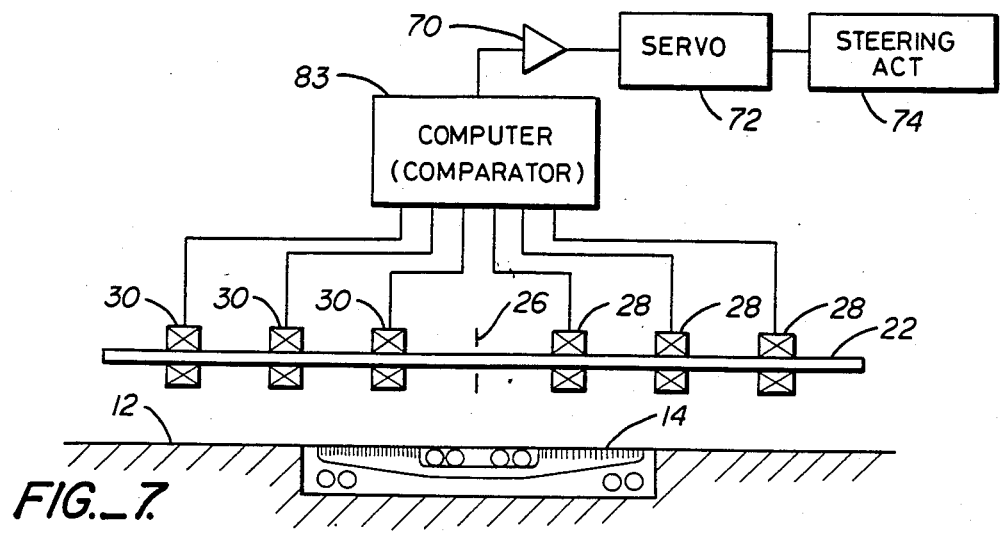
FIG._7.
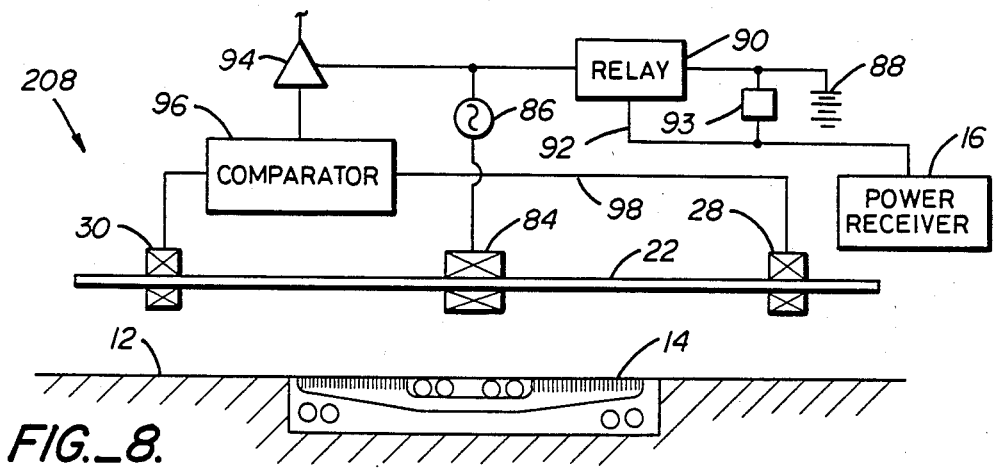
FIG._8.
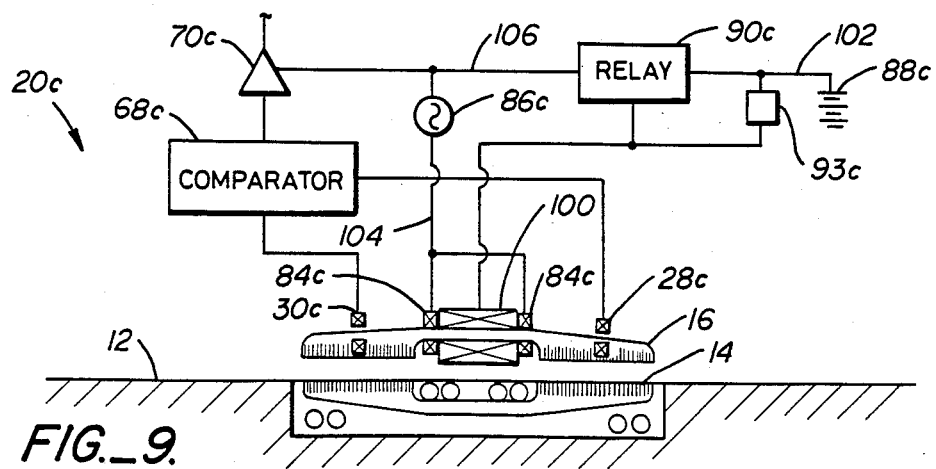
FIG._9.

GUIDANCE SYSTEM FOR INDUCTIVELY COUPLED ELECTRIC VEHICLES

FIELD OF INVENTION

This invention relates to trackless, inductively coupled electric vehicles and more particularly to an automatic guidance system for maintaining such a vehicle directly above a continuous roadway inductive power source as the vehicle moves along.

BACKGROUND OF THE INVENTION

Trackless electrical driven vehicles of the type disclosed in my U.S. Pat. Nos. 3,914,562 and 4,331,225 utilize a power receiving means for inductively coupling with a conductive power source embedded in the roadway. In order to provide adequate and efficient power transmission from the roadway power source inductor to the power receiving means, the vehicle (and thus its power receiving means) must maintain a position above or laterally aligned with the source within certain limits. Thus, it is necessary to develop a signal on the vehicle that is indicative of the quality of the vehicle's lateral alignment in order for either a driver or an automatic steering system to maintain the necessary positional alignment.

Heretofore, vehicle guidance systems using an embedded conductor that designates a vehicle path have been devised wherein the conductor creates a field of signal energy. Sensors provided on the vehicle are responsive to the signal energy and provide steering signals to maintain the vehicles in line with the conductor. Examples of guidance systems are shown in U.S. Pat. Nos. 4,310,789, 4,215,759 and 4,284,941. In all of the aforesaid patents, the vehicle is powered by means other than an inductively coupled electrical system.

The signal energy from the roadway conductor is typically radiated from a wire in a field that is co-axial with the conductor, and with a field strength that decreases with the radius from the conductor. With vehicles of the inductively coupled type, the shape and field strength of the electromagnetic field above the roadway inductor are very different, with heavier concentrations of flux located at the edges of the steel core of the inductor, and a relatively constant field strength in the region above the broad power conductor. Thus, guidance sensors of types used with embedded conductors would not produce a satisfactory signal versus offset relationship in the presence of the field above a roadway inductor. The present invention provides a solution to the aforesaid problems.

SUMMARY OF THE INVENTION

Accordingly, one object of the present invention is to provide a means for guiding an inductively coupled, electrically driven vehicle along a roadway having a continuous inductor core using the same magnetic flux that is used for the vehicle driving power.

Other objects of the invention are to provide, for an inductively coupled vehicle adapted to receive power from a continuous inductor core in a roadway, a guidance means that is reliable, easy to service and maintain and is particularly well adapted for ease and economy of manufacture.

Still another object of the invention is to provide a guidance means for an inductively coupled, electrically driven vehicle on a roadway that will operate in an emergency mode even if power in a roadway inductor is cut off.

Another more specific object of the present invention is to provide a guidance system for maintaining an inductively coupled, electrically driven vehicle directly above a continuously extending inductor in a roadway so that power therefrom can be extracted at an efficient level and unnecessary directional deviations of the vehicle from roadway inductors are kept to a minimum.

The aforesaid and other important objects of the invention are accomplished by a guidance apparatus that includes an elongated ferro-magnetic bar which is attached to the underside of an inductively coupled, electrically driven vehicle. The bar is oriented transverse to the longitudinal center line of the vehicle and at a location either fore or aft that is spaced from the major flux path between the roadway inductor and the inductor core of the vehicle power receiving means.

Spaced inwardly from each end of the ferrous bar is a sensor coil. The end portion of the bar extending outwardly from each coil forms a magnetic pole for receiving flux from the roadway inductor as the vehicle moves along. Magnetic flux from the roadway inductor flows to the end-pole portion and through the two sensor coils to produce a separate voltage from each coil. When the vehicle is directly over or in line with the roadway inductor and the coil sensors are equi-distant from the roadway inductor centerline, the voltages from the sensor coils are equal. If the vehicle moves further to one side, a greater flux is induced through the pole at one end of the ferrous bar and a lesser flux through the other pole, and consequently one coil sensor produces a greater voltage. Circuitry is provided to compare the voltage from each coil-sensor and produce an error signal which is used to control a steering servo on the vehicle. If power to the roadway inductor is suddenly lost, the guidance system according to the invention also provides a means for automatically supplying alternating current to a coil on the guidance sensor which thereby creates sufficient magnetic flux through the sensor bar and the roadway inductor to operate the sensor coils and maintain the automatic steering capability.

Other objects, advantages and features of the invention will become apparent from the following detailed description of one embodiment thereof, presented in conjunction with the accompanying drawings.

BRIEF DESCRIPTION OF THE DRAWING

FIG. 1 is a plan view of an inductively coupled electric vehicle having a guidance device according to the present invention.

FIG. 2 is an enlarged fragmentary front view in elevation of the vehicle in FIG. 1, showing a portion of the guidance device with magnetic flux lines indicated when the vehicle is centered over a inductor.

FIG. 3 is a view similar to FIG. 2 showing the vehicle and its guidance device moved laterally to one side of the roadway inductor and with appropriate flux lines indicated.

FIG. 4 is a diagrammatic view of the guidance device according to the present invention and showing other elements of the electrical circuit therefor.

FIG. 5 is a diagram showing signal output relative to displacement of the sensor coil for the guidance device of FIG. 1.

FIG. 6 is a view in elevation and in section showing a modified form of guidance device according to the invention utilizing sensor coils mounted on the vehicle inductor.

FIG. 7 is a view in elevation of a modified form of guidance device according to the present invention, utilizing multiple pairs of sensor coils.

FIG. 8 is a diagrammatic view of a modified form of the guidance device wherein battery power is automatically supplied to activate the guidance device when the roadway power source fails.

FIG. 9 is a diagrammatic view of a modified form of the guidance device wherein battery power is automatically supplied to activate a guidace device that is incoporated in the power receiving means when the roadway power source fails.

DETAILED DESCRIPTION OF PREFERRED EMBODIMENT

With reference to the drawing, FIG. 1 shows an electrically driven vehicle 10 on a roadway 12 that has a continuous, embedded power inductor 14. The vehicle has a power receiving means 16 that is inductively coupled to the roadway inductor 14, thereby providing power to move the vehicle. The vehicle shown has four wheels 18, and the power receiving means 16 is generally located between the front and rear wheels near the center of the vehicle. Details of the inductively coupled vehicle power system are shown and described in greater detail in U.S. Pat. Nos. 3,914,562 and 4,331,225.

In accordance with the present invention, a guidance device 20 for the vehicle 10 is provided which automatically steers it along the roadway 12 so that the vehicle's power receiving means 16 is maintained directly above the embedded roadway conductor 14 in its most efficient power receiving position as the vehicle moves along. In general, the guidance device comprises an elongated ferrous metal bar 22 which is attached to the vehicle, preferably near its front end. The longitudinal axis of the bar is horizontal and perpendicular to the longitudinal center line of the vehicle designated by numeral 24. The bar is installed on the vehicle so that the mid-point 26 between its ends is on the vehicle centerline 24.

Attached to the bar 22 and spaced outwardly at equal distances from its mid-point at opposite sides thereof are a pair of sensor coils 28 and 30. Each of these sensor coils is spaced inwardly from an outer end of the bar 22 so that end portions of the bar form magnetic pole areas 32 and 34 outwardly from the sensor coils.

As shown in FIG. 2, when the vehicle is located directly over the roadway inductor 14, that is, with the midpoint 26 of the bar 22 on a vertical plane 36 through the roadway inductor centerline, magnetic flux (designated by the lines 39) envelopes the bar along its length with the flux density decreasing with distance from the centerline of the roadway inductor. A significant amount of flux alternatly enters and leaves by the end pole portions 32 and 34 of the bar. This flux, flowing through the bar 22, causes an output voltage in each sensor coil 28 and 30. When the bar 22 is centered over the roadway inductor as in FIG. 2, the output voltages for the two sensor coils are equal. Now, when the vehicle 10, and thus the bar 22, moves laterally away the roadway inductor centerline, as shown in FIG. 3, one end pole portion 32 moves into an area of greater flux density while the opposite end pole portion 34 moves into an area of less flux density. Hence, as shown in FIG. 3, the voltage output from one sensor coil 28 becomes greater than the output from the opposite coil 30.

As shown in the diagram of FIG. 4, the outputs from the sensor coils 28 and 30 are connected to a detection circuit 40 for producing a control signal to steer the vehicle 10 and thereby maintain its alignment with the roadway inductor 14. In this circuit, the two sensor coils 28 and 30 are connected together at one end by a common lead 42. The other end of coil 28 is connected to a rectifying diode 44 and the other end of coil 30 is connected to a similar diode 46. These diodes convert the outputs from the two coils to a pulsating positive voltage in a pair of output leads 48 and 50, respectively. Each of these output leads is connected through capacitors and resistors to the common lead 42. The output lead 48 is connected through a capacitor 52 and the lead 50 is connected through a similar capacitor 54. A pair of resistors 56 and 58 are provided, one in parallel with each capacitor, to form a filter means for each sensor output. The output leads from the rectifying diodes 42 and 44 in the detection circuits are provided with output terminals 60 and 62 respectively. The magnitude of the voltage developed at these output points is related to the amount of offset or lateral deviation of the vehicle 10 from the roadway inductor 14, while the polarity (i.e. which output point is more positive) indicates the direction of the offset.

As further shown in FIG. 4, the outputs from the detection circuit are fed via a pair of leads 64 and 66 to a voltage comparator 68 of a suitable type whose derived output in turn is supplied through an amplifier 70 to a steering actuator 74. The steering actuator 74 for the vehicle reacts accordingly to move the vehicle. Extending between the output leads 64 and 66 is a lead 76 in which are connected a pair of clamping zener diodes 80 and 82, respectively whose other terminals are connected together to form a series circuit. These zener diodes function to limit the output voltage between terminal 60 and 62 to a maximum voltage of either polarity equal to the characteristic zener voltage.

FIG. 5 is a diagram which plots the variation of signal output level with lateral displacement of the sensor for typical operation of the guidance device 20, as described above. The solid lines of FIG. 5 represent the output of the sensor when zener diodes 80, 82 are in the circuit as shown. The output of the sensor without the zener diode in the circuit would be as shown in the dashed lines. The peaks of the curve without the zener diodes occur when one of the sensor coils is directly over the centerline of the roadway power inductor 14. It has been found that the shape of the curve in the centered region can be altered by varying the position of the coils on the rod 22. In the case where the sensor output is to be used as an input to a steering servo 72, the output can be clamped at constant levels 'Z' by the zener diodes 80 and 82 as described above in order to increase the 'gathering' range of the servo, i.e. the range at which the servo 72 will steer at a maximum rate toward the inductor centerline 36, while maintaining a relatively linear gain near the centerline. Without the presence of the zener diodes, a displacement of the sensor beyond the peaks of the curve would provide an ambiguous signal wherein the same signal magnitude could be produced at two different displacements.

It has been found that it is of advantage to mount the sensor bar 22 high enough above the roadway to desensitize its output from the effects of localized perterbations in magnetic flux density that occur at boundaries or surface irregularities of the core steel in the roadway inductor 14, such as the edges of its poles. Generally this height should be in the range of 4 to 12 inches. The increased height also tends to increase the sensor's useful lateral range. Although the magnitude of the output signal will decrease with height, this is not a problem since compensating increases in signal can be achieved by winding more turns on the sensor coils 28 and 30, or by increasing the area of the sensor's poles, or amplifying the sensor's output.

A variation of the sensor 20 can be incorporated in an inductive power coupling in the core of the vehicle power receiver inductor 16, as shown in FIG. 6. Sensing coils 28A and 30A can be wound longitudinally and symetrically around and power receiving inductor core 16, as shown. Although the magnitude of the signal from these coils will depend on the voltage being induced in the power coupling 16, this is typically not a significant problem since the power voltage is usually regulated closely.

A modified guidance device 20A, as shown in FIG. 7 can be constructed with several coil pairs 28 and 30 spaced apart symmetrically along the ferrous sensor bar 22, with the coil of each pair being equi-distant from its centerpoint 36. It can be convenient to use this type of arrangement when interfacing with a computer 83 as a master comparator, which can cyclically and successively scan and read the output of the coils in order to deduce the precise position of the centerline of the roadway inductor by comparing the magnitude of the output of the symmetrical coil pairs as preivously described.

The electrically driven vehicles as described in the aforesaid previously issued U.S. Pat. Nos. 3,914,562 and 4,331,225 are normally provided with a battery which enables the vehicle to be operated off of a roadway having a power inductor. Such a battery can also be used to operate the guidance system of the present invention if the power inductor in the roadway suddenly loses power when the vehicle is traveling along it.

Normally a power interruption in an inductively powered/guided vehicle system would also cause the vehicle to loose guidance. This would be particularly undesirable where the roadway does not have curbs to confine the vehicle to its roadway and thereby prevent it running into some obstruction in its path. However, the guidance device as described, can be adapted to provide guidance to the vehicle even if current ceases to flow in the roadway inductor.

As shown diagrammatically in FIG. 8, in another modified guidance device 20B, a driver coil 84 is mounted on the centerline of the sensor bar 22 having sensor coils 28B and 30B. A frequency generator 86 connected to a battery 88 through a relay 90, causes current to flow through the driver coil. This causes a magnetic flux to circulate through the sensor bar 22, across the airgap between the bar and the roadway 12 and through the steel core in the roadway inductor 14. Any misalignment between the centerline of the roadway inductor and the sensor bar will cause an imbalance in the flux through the end poles of the bar, and the voltages developed in the sensing coils 28B and 30B. Because the excitation for the sensor bar 22 is provided on the vehicle instead of by the roadway inductor, the guidance signal is available even when a power failure in the road occurs.

The relay 90 may be provided to interrupt power to the driver coil 84 so long as coupled voltage from an active roadway inductor is present. The operating coil of the relay is connected to receive voltage from the roadway inductor via a lead 92 to the vehicle power receiving means 16, when it is properly coupled. Power from the vehicle power receiving means is also normally furnished through a rectifier 93 to the lead between the relay and the battery. When a power failure occurs and the voltage signal from the power receiver 16 is removed, the relay 90 operates to allow battery power to flow to the signal generator 86 and to an amplifier 94. The latter is adjusted to boost the guidance signal from the signal generator at the same level that was normally provided when power was active in the roadway. The output from amplifier 94 is connected to the guidance servo 72 in the same manner as shown in FIG. 4. Alternatively, a comparator circuit 96 connected in a lead 98 between the sensor coils 28 and 30 would be tuned to the signal generator's frequency instead of the roadway power frequency. In this case the signal generator would be active at all times, and the effect of the poewr frequency from the inductor would be discriminated against by the tuned circuit.

A similar self-powered sensing arrangement for a modified guidance device 20C may be used, as shown in FIG. 9, wherein a pair of sensor coils 28C and 30C are mounted on the top side of the power inductor or power receiving means 16 of the vehicle. Here, the sensor coils 28C and 30C, are partially in and out of the power inductor and are equally spaced on opposite sides from its centerline. As with the previous embodiments, the two sensor coils 28C and 30C are connected by separate leads to a comparator 68C. Whose output is supplied to an amplifier 70C. The power inductor has a main pickup coil 100 which extends from opposite sides of its centerline and is connected to a relay 90C and also a rectifier 93C. The relay is connected between the amplifier 70C and a battery 88C. The rectifier 93C is connected to a lead 102 between the relay and the battery. A pair of driver coils 84C are mounted on the power inductor at opposite ends of its main pickup coil 100 and equi-distant from the inductor centerline. These driver coils are connected to a common lead 104, through a frequency generator 86C to a lead 106 between the relay 90C and the amplifier 94C. The driver coils 84C function in the aforesaid arrangement in essentially the same manner as the single driver coil 84. That is, when the power receiver 16 fails to supply power, the relay 90C operates to furnish battery power through the relay to the signal generator 86C and thus to the two driver coils 84C which induce a field in the inductor 16. Lateral movement of the vehicle and the power inductor 16 from the roadway inductor again produces a difference in voltage output from the sensors 28C and 30C which are furnished to the comparator 68C to produce steering control signals as previously described.

From the foregoing it should be apparent that the present invention provides a highly efficient but relatively simple guidance system for inductively coupled vehicles which utilizes a portion of the same magnetic flux from a roadway inductor that also supplies the driving power for the vehicle. Yet, the guidance system can be operative to maintain guided steering for the vehicle in the event of roadway power failure.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. An automatic guidance device for an electrically driven vehicle adapted for use on a prepared roadway having an associated power source including a magnetic circuit containing a ferrous metal core to create a magnetic field, said vehicle having wheels including at least one pair of steerable wheels, a steering actuator connected to said wheels, a power receiving means including a ferrous metal core adapted to inductively couple with said roadway core and furnish power therefrom to a vehicle drive means, said automotive guidance comprising:

an elongated ferrous rod attached to said vehicle in a position substantially perpendicular to the longitudinal center line of said vehicle;

a first pair of sensor coils attached to said ferrous rod at spaced apart locations thereon, said coils being spaced equi-distant from the midpoint of said rod and also inwardly from its opposite ends so that the end portion of said rod extending outwardly from each sensor coil forms a receiving pole for magnetic flux from said roadway core, said flux being adapted to flow longitudinally through said ferrous rod and thereby produce voltage outputs from said sensor coils, said outputs from said sensor coils being equal when said vehicle is directly above said roadway core;

means for comparing said voltage outputs from said sensor coils to produce an error signal when said vehicle moves laterally away from said roadway core and said outputs are therefore not equal;

means for supplying said error signal to said steering actuator on said vehicle to cause it to maintain the vehicle and its power receiving means substantially directly above said roadway core as said vehicle moves forwardly along it.

2. The guidance device as described in claim 1 including additional pairs of sensor coils attached to said rod at spaced apart locations inwardly from said first pair of sensor coils; said means for comparing including computer means for evaluating outputs from all pairs of sensor coils to produce a highly sensitive and accurate error signal for said steering actutor on said vehicle 3. The guidance device as described in claim 1 wherein said midpoint of said rod is in the same plane that contains the longitudinal center line of said vehicle.

4. The guidance device as described in claim 1 wherein said ferrous metal rod is mounted on the front end of said vehicle forwardly from its power receiving means.

5. The guidance device as described in claim 1 including diode means for rectifying the voltages produced by said sensor coils; and means for filtering the rectified signals from said sensor coils before they are furnished to said comparing means.

6. The guidance device as described in claim 1 wherein said vehicle has a battery; means providing a current path through a rectifier to said battery from said core of said power receiving means; relay means connected to said power receiving means of said vehicle and responsive to a power failure in the roadway core to allow said battery to furnish power to a third coil on the center of said ferrous bar thereby creating magnetic flux through said ferrous bar and roadway core and activating said sensor coils to maintain steering signal outputs therefrom.

7. An automatic guidance device for an electrically driven vehicle adapted for use on a prepared roadway having an associated power source including a magnetic circuit containing a ferrous metal core to create a magnetic field, said vehicle having wheels including at least one pair of steerable wheels, a steering actuator connected to said wheels, a power receiving means including a ferrous metal core adapted to inductively couple with said roadway core and furnish power therefrom to a vehicle drive means connected to said steerable wheels, said automotive guidance comprising:

a pair of sensor coils attached to the ferrous metal core of the power receiving means at spaced apart locations thereon, said coils being spaced equi-distant from the centerline of said core and also inwardly from its oppposite ends so that the end portions extending outwardly from each sensor coil form receiving poles for magnetic flux from said roadway core, said flux being adapted to flow transversely through said core of the power receiving means and thereby produce voltage outputs from said sensor coils, said outputs from said sensor coils being equal when said vehicle is directly above said roadway core;

means for comparing said voltage outputs from said sensor coils to produce an error signal when said vehicle moves laterally away from said roadway core and said outputs are therefore not equal;

means for supplying said error signal to said steering actuator on said vehicle to cause it to maintain the vehicle and its power receiving means substantially directly above said roadway core as said vehicle moves forwardly along it.

8. The automatic guidance device of claim 7 wherein said vehicle has a battery; driver coil means located along the centerline of the metal case of the vehicle power receiving means; means providing a current path through a rectifier to said battery from said core of said power receiving means; relay means connected to said power receiving means of said vehicle and responsive to a power failure in the roadway core to allow said battery to furnish power to said driver coil means, thereby creating flux through said vehicle power receiving core and said roadway core and activating said sensor coils to maintain steering signal outputs therefrom.

9. The automatic guidance device of claim 8 wherein said driver coil means comprises a pair of sensor coils spaced apart at an equal distance from the center line of said vehicle power receving core.